(12) United States Patent  (10) Patent No.: US 7,548,337 B2
Teranishi et al. (45) Date of Patent: Jun. 16, 2009

(54) IMAGE FORMING DEVICE

(75) Inventors: Katsuyuki Teranishi, Osaka (JP);
Hidechika Kumamoto, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 828 days.

(21) Appl. No.: 11/258,881

(22) Filed: Oct. 27, 2005

(65) Prior Publication Data

US 2007/0097433 A1 May 3, 2007

(51) Int. Cl.
*G06F 3/12* (2006.01)
*G06F 12/00* (2006.01)
*G06K 15/00* (2006.01)

(52) U.S. Cl. .................... 358/1.16; 358/1.15; 358/1.13; 711/115

(58) Field of Classification Search ................ 358/1.15, 358/1.16, 1.17, 1.18, 1.13, 3.28, 524, 444; 382/305, 306, 307; 711/115
See application file for complete search history.

(56) References Cited

U.S. PATENT DOCUMENTS

| | | | |
|---|---|---|---|
| 6,356,357 B1 * | 3/2002 | Anderson et al. | 358/1.17 |
| 6,473,811 B1 * | 10/2002 | Onsen | 710/15 |
| 6,498,658 B1 | 12/2002 | Sekikawa | |
| 6,832,010 B2 * | 12/2004 | Miyazaki et al. | 382/305 |
| 7,113,720 B2 * | 9/2006 | Hirano | 399/80 |
| 7,264,411 B2 * | 9/2007 | Matsunaga et al. | 400/62 |
| 7,382,938 B2 * | 6/2008 | Kizaki et al. | 382/305 |
| 2002/0051019 A1 * | 5/2002 | De Vorchik et al. | 345/835 |
| 2003/0184803 A1 * | 10/2003 | Yamada et al. | 358/1.16 |
| 2005/0128319 A1 * | 6/2005 | Morino | 348/231.7 |
| 2005/0141043 A1 * | 6/2005 | Nakazawa | 358/444 |
| 2005/0193170 A1 * | 9/2005 | Endo | 711/115 |
| 2006/0044949 A1 * | 3/2006 | Ferlitsch | 369/30.01 |
| 2006/0077424 A1 * | 4/2006 | Maruta et al. | 358/1.15 |
| 2006/0265743 A1 * | 11/2006 | Kusunoki et al. | 726/21 |

FOREIGN PATENT DOCUMENTS

| | | | |
|---|---|---|---|
| JP | H04-153822 A | 5/1992 | |
| JP | H11-136477 A | 5/1999 | |
| JP | 2002-041337 A | 2/2002 | |
| JP | 2003-204424 A | 7/2003 | |

* cited by examiner

*Primary Examiner*—Twyler L Haskins
*Assistant Examiner*—Jonathan R Beckley
(74) *Attorney, Agent, or Firm*—Global IP Counselors, LLP

(57) ABSTRACT

This image forming device 1 comprises a control unit, a connector interface 31, an external memory 33, and an image forming unit. The control unit instructs the output of a predetermined image data. The connector interface 31 is connected to the control unit. The external memory 14 can be removably connected to the connector interface 31 while it stores the output image data. The image forming unit is capable of receiving the instruction from the control unit and delivering onto paper the image data stored in the external memory 14.

5 Claims, 1 Drawing Sheet

IMAGE FORMING DEVICE

FIELD OF THE INVENTION

The present invention relates to an image forming device.

BACKGROUND INFORMATION

A conventional image forming device, for instance a digital copying machine, comprises an image reading unit, a storage device for temporarily storing the image data read by the image reading unit, and an output means for reading and delivering onto a transfer medium the image data stored in the storage device. A nonvolatile memory, such as a hard disk, is generally used as the storage device.

In such a copier, the image data remains in the storage device after the image data output until it is overwritten by the image data of the next document. If, for instance, the copier is disposed of in this state, and the internal hard disk or the like is taken out, in some cases, the image data remaining on the disc is analyzed and externally disclosed. This problem is serious, in particular when image data containing highly confidential information has been handled.

Thus, conventionally, a method has already been proposed in which a confidential document mode is provided, and if this mode has been set, the image data is deleted when the image data output is finished, and a method has been proposed in which the image data is deleted while the image forming device is idle.

However, erasing image data requires some time. In particular, if a hard disk is used as the storage device, for deleting image data that has been stored, an A4 size image data requires on the order of 0.75 seconds to be deleted, and the time required to delete 80 pages of image data is on the order of 60 seconds.

In addition, while the image data is being deleted, the next process such as printing cannot be carried out continuously, leading to the problem of drop in processing efficiency. An object of the present invention is to prevent external disclosure of image data while avoiding a drop in processing efficiency in an image forming device wherein image data is stored in a storage device during output.

SUMMARY OF THE INVENTION

The image forming device according to claim 1 comprises a control unit, an interface, a first storage device and an output means. The control unit instructs the output of a predetermined image data. The interface is connected to the control unit. The first storage device can be removably connected to the interface while it stores the image data that will be delivered. The output means is capable of receiving the instruction from the control unit and delivering the image data stored in the first storage device onto the transfer medium.

In this device, when the output of a predetermined image data is instructed, this image data is written to the first storage device by the control unit, and the image data stored therein is delivered onto the transfer medium by the output means. Here, although the image data stored with the first storage device remains within the first storage device even after the output, removing the first storage device prevents the image data from remaining within the device, preventing external disclosure.

In addition, in the present invention, the image data also includes text data. In addition, examples of predetermined image data include image data read with the image reading unit when functioning as a copier, image data sent by an externally connected device such as a personal computer (PC) or a scanner when functioning as a printer, and image data sent by another facsimile when functioning as a facsimile. Furthermore, output image data includes image data for which predetermined image processing is finished and is ready for output onto the transfer medium. In addition, the interface includes dedicated drives and general-purpose interfaces (USB, IEEE 1394 or the like).

The image forming device according to claim 2 is the device of claim 1, wherein the first storage device is a storage medium having a memory content that can be erased.

In this device, the possibility of erasing the content of the first storage device where the image data is stored can more reliably prevent the image data from being disclosed externally.

Examples of such a first storage device include custom products using a general-purpose memory such as a hard disk, a Compact Flash™ or a micro-drive, and a nonvolatile memory, and storage devices with a battery or the like backing up a volatile memory such as an SDRAM, and the like.

The image forming device according to claim 3 is the device of claim 1 further comprising a second storage device connected to the control unit. Then, the control unit writes the output image data to the first storage device when the first storage device is connected to the interface, and writes the output image data to the second storage device when the first storage device is not connected to the interface.

This device separates data storage locations based on the differences in confidentiality of image data by storing in the first storage device those image data that are highly confidential and by storing in the second storage device those image data that are not.

In addition, in a device comprising a second storage device to which image data can be written, even if they are highly confidential, because this is installed in a non-removable manner within a conventional digital copying machine or the like, the use of a removable first storage device also avoids writing highly confidential image data to such a second storage device.

The image forming device according to claim 4 is the device of claim 3 further comprising a display unit capable of displaying whether any storage device is being written to by the control unit.

In this device, when a plurality of storage devices are present, displaying whether any of them is being written to gives the user peace of mind.

The image forming device according to claim 5 is the device of claim 1, wherein the control unit does not instruct the output means to output image data when the first storage device is not connected to the interface.

In this device, the output means output only when the status allows the image data to be written to the first storage device, is reliably possible avoid the image data being left within the device.

In addition, such a restriction may apply not only to output by the output means, but also to image reading by the image reading unit, spool reception of the print data, reception of incoming facsimile data, or the like.

The image forming device according to claim 6 is the device of claim 1, wherein the control unit is capable of recognizing the capacity of the first storage device connected to the interface. In addition, it further comprises a display unit capable of displaying the capacity of the first storage device.

In this device, useful information can be provided to the user by indicating the storage capacity of the first storage device.

The image forming device according to claim 7 is the device of claim 1, wherein the control unit is capable of recognizing the free space in the first storage device connected to the interface. In addition, this device further comprises a display unit capable of displaying, in case the size of the image data to be written to the first storage device exceeds the capacity of the free space, an indication of the same.

In this device, for instance, when an attempt is made to write image data of a size that cannot be accommodated the first storage device, the user is informed beforehand.

According to the present invention, although the image data stored with the first storage device remains within the first storage device even after the output, removing the first storage device prevents the image data from being within the device, and thus prevents external disclosure.

DETAILED DESCRIPTION OF THE PREFERRED EMBODIMENTS

[Constitution of the Image Forming Device]

Figure 1:
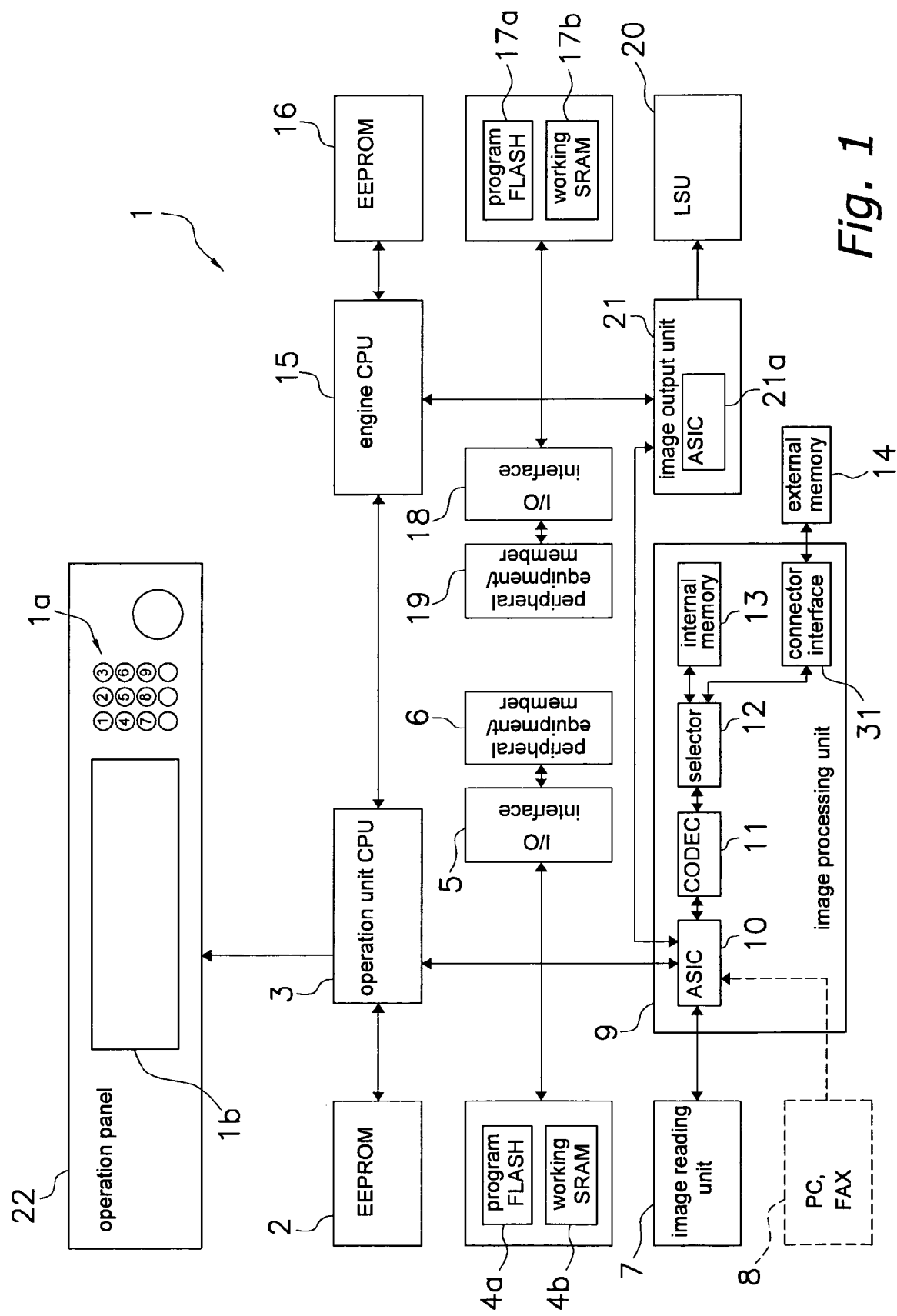
FIG. 1 is a block diagram schematically showing the constitution of an image forming device in which one embodiment of the present invention has been applied.

An image forming device 1 in which one embodiment of the present invention has been applied is shown in FIG. 1.

This image forming device is a multi-function machine having combined functions as a copier, a printer, a facsimile and a scanner, and comprises as the main control system an operation unit CPU 3, an engine CPU 15, an image processing unit 9, and an image output unit 21.

The operation unit CPU 3 performs control and the like of a control panel 22, and is connected to a backup EEPROM 2, the engine CPU 15 and the image processing unit 9. The control panel 22 has a plurality of operation keys 1a and a touch panel type display unit 1b.

The display unit 1b, in addition to displaying various operation screens and the like, displays whether the image processing unit 9 writes to either of an external memory 14 and an internal memory 13 described below, the capacity and free space of the external memory 14, the indication that the size of the image data to be written in the external memory 14 exceeds the capacity of the free space, and the like.

In addition, a peripheral device and a member 6 are connected through an input-output interface 5 to a FLASH 4a serving as a program memory for the operation unit CPU 3 and an SDRAM 4b serving as a working RAM.

The engine CPU 15 performs control or the like of the engine, and is connected to a backup EEPROM 16, the operation unit CPU 3 and the image output unit 21. The engine contains an image forming unit (output device) such as a photosensitive drum and peripheral device therefor, and various electrical components a including peripheral device and a member 19 containing a main motor, various sensors, a fixing device heater, a paper feeding device clutch and the like, and a peripheral device and a member 6 containing a scanner motor, lamps, various sensors and the like, of the image reading unit 7, not shown. The image forming unit receives instruction from the image output unit 21 forms an image on paper or the like image with the data stored in the internal memory 13 or the external memory 14.

In addition, a peripheral device and a member 19 are connected through an input-output interface 18 to a FLASH 17a serving as a program memory for the engine CPU 15 and an SRAM 17b serving as a working RAM.

The image processing unit 9 is connected to an image reading unit 7 and an externally connected equipment 8 such as a PC and a facsimile, and is capable of carrying out various image processes on image data received therefrom. In addition, the image processing unit 9 is connected to the operation unit CPU 3 and the image output unit 21. The image processing unit 9 is primarily constituted by an ASIC 10, a CODEC 11, a selector 12, an internal memory (the second storage device) 13 and a connector interface 31.

The ASIC 10 of the image processing unit 9 switches the selector 12, on one hand, to write to the external memory 14 the image data subjected to a predetermined image processing when the external memory 14 is connected to the connector interface 31, and on the other hand, to write to the internal memory 13 the image data subjected to image processing, when the external memory 14 is not connected to the connector interface 31. In addition, the ASIC 10 of the image processing unit 9 can also recognize whether the external memory 14 has been connected to the connector interface 3, the capacity and free space of the external memory 14, whether the image data is being written to either of the memories 13 or 14, whether the size of the image data to be written to the external memory 14 exceeds the free capacity, and the like.

The connector interface 31 has an open portion (not shown) for receiving a connector terminal (not shown) of the external memory (first storage device) 14 described below.

The external memory 14 is constituted by a general-purpose memory capable of erasing the memory content, has a connector terminal for mounting on the connector interface 31, and is removable from the connector interface 31. The image data delivered from the image output unit 21 to the engine CPU 15 is stored in the external memory 14. Note that examples of general-purpose memory used as external memory 14 include Compact Flash™, micro-drive and the like.

The internal memory 13 is constituted by a DIMM or a hard disk, and is connected to the selector 12.

The image output unit 21 is mainly constituted by an ASIC 21a, and is connected to a laser scanner unit (LSU) 20, the engine CPU 15 and the image processing unit 9. The image output unit 21, when instructed to print, reads the image data stored in the external memory 14 or internal memory 13 and delivers it to the LSU 20.

[Operation of the Image Forming Device]

Next, the operation of the image forming device 1 will be described.

Here, a description will be given taking as an example the case where a PC serving as an externally connected device is connected to the image forming device 1 while sending the image data within this PC to the image forming device 1 for printing (case where the device is made to function as a printer) will be explained. In addition, it is assumed that a printer driver for the image forming device 1 is installed on the PC.

In addition, from the point of reception of the image data by the externally connected device 8 onward, operations are substantially the same in cases where the device is made to function as a copier or a facsimile.

In this image forming device 1, when trying to print an image data that must be kept confidential, first, the external memory 14 is connected to the image processing unit 9 by inserting it into the connector interface 31. Then, the image processing unit 9 recognizes that the external memory 14 has been connected, the capacity and free space of the external memory 14 and the like, and these contents are displayed on the display unit 1b of the control panel 22 through the operation unit CPU 3.

Then, in the PC connected to the image forming device 1, when the desired image data to be printed is selected and printing is instructed, an output signal is sent to the image forming device 1, and in the image forming device 1 that has received this signal, various image processes are carried out in the image processing unit 9.

Next, the image data for which processing by the image processing unit 9 has finished is written to the external memory 14 at the same time as it is sent to the image forming unit through the image output unit 21 and the LSU 20 to be delivered onto paper.

After printing, if the external memory 14 is read out from the connector interface 31, the data can be separately saved in the PC or erased in the PC, as necessary.

On the other hand, when trying to print image data need not be kept confidential, the output signal is transmitted by instructing from the PC to print, without inserting the external memory 14 into the connector interface 31, in the same way as described above.

Then, in the image forming device 1 that has received the output signal, the image data that underwent image processing by the image processing unit 9 is written to the internal memory 13 while at the same time it is sent to the image forming unit through the image output unit 21 or the like to be delivered onto paper, in the same way as described above.

In addition, the image data that has been written to the internal memory 13 can be erased by operating the control panel 22, as necessary.

According to the image forming device 1 described above, highly confidential image data can be stored in the external memory 14 without being stored in the internal memory 13, and this external memory 14, as described above, can be removed. Therefore, according to this device 1, it is possible to prevent highly confidential image data from being left in the device 1, and thereby limit external disclosure. In addition, as the external memory 14 that has been removed is in general managed by the user who instructed the printing instruction, thus further reducing the risk of external disclosure.

Furthermore, according to this image forming device 1, when writing the image data to the external memory 14, this is achieved without an overwrite process, which is needed when writing to the internal memory 13, and thus without requiring the time for such a process.

In addition, as a general-purpose memory is used as the external memory 14, for instance, by connecting the external memory 14 that has been removed to another interface connected to a PC or the like, the memory content can be saved in the PC or erased by performing a simple operation.

Other Embodiments (a) In the above embodiment, the image forming device may be one that does not contain an internal memory. In this case, output of image data is only possible when an external memory is connected, so that external disclosure of confidential information can avoided more reliably.

(b) The constitution may be such that, in the above embodiment, reading of the image, spooling of the print data, reception of facsimile receipt data, and output, cannot be carried out as long as an external memory is not connected to the connecting interface.

What is claimed is:

1. An image forming device comprising:
a control unit for instructing the output of an image data;
an interface connected to the control unit;
a first storage device, removably connected to the interface, for storing the image data that will be delivered;
an output means for receiving a print instruction from the control unit and delivering the image data stored in the first storage device onto a transfer medium;
a second storage device connected to the control unit, wherein
the control unit writes the image data only to the first storage device when the first storage device is connected to the interface, and writes the output image data to the second storage device when the first storage device is not connected to the interface and wherein
the control unit does not instruct the output means to output the image data when the first storage device is not connected to the interface.

2. The image forming device as recited in claim 1, wherein the first storage device is a storage medium having a memory content that can be erased.

3. The image forming device as recited in claim 1 further comprising a display unit for displaying whether any storage device is being written to by the control unit.

4. The image forming device as recited in claim 1, wherein the control unit recognizes a capacity of the first storage device connected to the interface,
and further comprising a display unit for displaying the capacity of the first storage device.

5. The image forming device as recited in claim 1, wherein the control unit recognizes a free space in the first storage device connected to the interface, and
further comprising a display unit for displaying, in a case when size of the image data to be written to the second storage device exceeds a capacity of the free space, an indication of the same.

* * * * *